(12) United States Patent
Chen

(10) Patent No.: US 9,915,581 B2
(45) Date of Patent: Mar. 13, 2018

(54) SEAL DETECTING DEVICE AND MEANS THEREOF

(71) Applicant: GLTTEK CO., LTD, Hsinchu (TW)

(72) Inventor: Chiung Nan Chen, Hsinchu (TW)

(73) Assignee: GLTTEK CO., LTD, Hsinchu (TW)

( * ) Notice: Subject to any disclaimer, the term of this patent is extended or adjusted under 35 U.S.C. 154(b) by 117 days.

(21) Appl. No.: 15/088,107

(22) Filed: Mar. 31, 2016

(65) Prior Publication Data

US 2017/0284890 A1   Oct. 5, 2017

(51) Int. Cl.
*G01M 3/26* (2006.01)
*G01M 3/32* (2006.01)

(52) U.S. Cl.
CPC ........ *G01M 3/3209* (2013.01); *G01M 3/3254* (2013.01)

(58) Field of Classification Search
CPC ............ G01M 3/00; G01M 3/26; G01M 3/32; G01M 3/3209; G01M 3/3254
See application file for complete search history.

(56) References Cited

U.S. PATENT DOCUMENTS

| | | | | |
|---|---|---|---|---|
| 6,308,556 | B1 * | 10/2001 | Sagi | G01M 3/3254 73/40 |
| 7,000,456 | B2 * | 2/2006 | Lehmann | G01M 3/3281 73/40 |
| 2011/0011164 | A1 * | 1/2011 | Terentiev | G01M 3/227 73/40.7 |
| 2016/0209294 | A1 * | 7/2016 | Wetzig | G01M 3/3281 |
| 2017/0254720 | A1 * | 9/2017 | Decker | G01M 3/26 |
| 2017/0268957 | A1 * | 9/2017 | Wetzig | G01M 3/3218 |

FOREIGN PATENT DOCUMENTS

NL   9100834 A   * 12/1992 ............ G01M 3/329

* cited by examiner

*Primary Examiner* — Nguyen Ha
(74) *Attorney, Agent, or Firm* — Chun-Ming Shih

(57) ABSTRACT

A seal detecting device and means for detecting a leakage on an outer case of an electronic device include providing a through hole on the outer case of the electronic device, an inner side of the electronic device is connected to an outer side of the electronic device; providing an airtight container, placing the outer case of the electronic device into the airtight container, one of the inner side and outer side of the outer case is defined as a gas supply side, and the other side is a detecting side; supplying compressed gas to the gas supply side; leading the detecting side to outside and detect a gas flow, so as to detect if there is a leakage on the outer case of the electronic device. The device and means have the advantages of high sensitivity, quick detecting speed, and high accuracy.

13 Claims, 4 Drawing Sheets

SEAL DETECTING DEVICE AND MEANS THEREOF

TECHNICAL FIELD

The technical field relates to a seal detecting device and means for detecting if there is a leakage in the sealing of the electronic device.

RELATED ART

Electronic devices, such as smartphone, personal digital assistant (PDA), tablet, and computer, etc., have plenty of powerful functions, and also have become indispensable items in modern people's life and work. More and more requirements for the specification of the electronic devices from the consumers have been requested, and waterproof function is one of them. The electronic devices with waterproof function can be used in the rain or in the water. Therefore, by the more and more production of the waterproofed electronic devices, each one of them should pass the waterproof test to see if there is a leakage after being manufactured.

The current method used to test the sealing condition of the electronic devices is mainly focused on pressure test, which includes providing a sealed pressure chamber. The initial pressure in the sealed pressure chamber is larger than atmosphere; placing the waterproofed electronic device into the sealed pressure chamber and staying for a predetermined time. After staying in a predetermined time, test if the pressure in the chamber decreases to lower than the predetermined threshold pressure. If the pressure is lower than the threshold pressure, it means that the electronic device has poor waterproof ability, and thus cannot fulfill the waterproof requirement.

Even though this testing method can find out if there is a leakage in the electronic devices, this method still has the following drawbacks: 1. The electronic devices are placed inside a pressure chamber. If the electronic devices have a leakage, the gas in the pressure chamber will enter into the electronic devices to lower the pressure in the pressure chamber, so as to detect if a leakage of the electronic devices exists. However, the detecting sensitivity is low, and thus the detecting result is often inaccurate. Moreover, this method takes longer time for detecting, about 30 seconds or longer, which results in higher cost, and thus the time to present the electronic devices to the market will be postponed due to the longer product testing time. 2. If the sealed pressure chamber itself or the sealing elements has a leakage, the pressure in the pressure chamber will decrease as well, and thus it cannot be detected where the leakage is. This may also cause low detecting accuracy and affect the detecting results.

BRIEF SUMMARY

An exemplary embodiment of the present invention provides a quick-testing, sensitive, and high accuracy seal detecting device and means.

In the preferred embodiment of the present invention, a seal detecting device for detecting a leakage on an outer case of an electronic device is provided. An outer case of the electronic device is provided with a through hole, an inner side of the outer case is connected to an outer side of the outer case through the through hole, the seal detecting device comprising: a container includes an accommodating space, the accommodating space has an opening, the accommodating space communicates with outer space and has a cover disposed thereon to cover the opening so as to form an airtight container; when being under detection, the outer case is placed inside the airtight container, the cover covers and seals the through hole of the outer case, one of the inner side and outer side of the outer case is a gas supply side, and the other side is a detecting side; a compressed gas supplying device connected to the gas supply side of the outer case inside the airtight container to provide compressed gas; and a flowmeter connected to the detecting side of the outer case to detect a flow so as to detect if there is a leakage on the outer case of the electronic device.

The seal detecting device according to the present invention, wherein the inner side of the electronic device is gas supply side, and the outer side is detecting side.

The seal detecting device according to the present invention, wherein the outer side of the electronic device is gas supply side, and the inner side is detecting side.

The seal detecting device according to the present invention, wherein the compressed gas supplying device is a gas compressor or a container storing compressed gas.

The seal detecting device according to the present invention, wherein the compressed gas supplying device has a control valve at an outputting end for turning on or shutting off an outputting of compressed gas.

The seal detecting device according to the present invention, wherein the gas supply side of the outer case of the electronic device has a control valve for exhausting gas.

The seal detecting device according to the present invention, wherein the gas supply side of the outer case of the electronic device has a control valve for discharging gas.

The seal detecting device according to the present invention, further comprises a signal processor, the signal processor including a calculating module, an analogue-digital convertor, and an input/output module; the flowmeter is an electronical gas flowmeter, wherein an analogue signal of the flowmeter is converted to a digital signal by the analogue-digital convertor, and the digital signal is processed by the calculating module; the input/output module inputs a command to the calculating module to output figure and text messages.

The seal detecting device according to the present invention, wherein the flowmeter is a digital display flowmeter.

Another preferred embodiment according to the present invention further provides a seal detecting means, comprising: a) providing a through hole on an outer case of the electronic device, an inner side of the outer case being connected to an outer side of the outer case through the through hole; b) providing an airtight container, placing the outer case of the electronic device in step a) into the airtight container, the through hole of the outer case being in closed and sealed contact with the airtight container, one of the inner side and outer side of the outer case being a gas supply side, and the other side being a detecting side; c) supplying compressed gas to the gas supply side in step b); d) leading the detecting side to outside; e) detecting gas flow in step d); f) determining if there is a leakage; the leakage existing if the gas flow is detected, otherwise no leakage exists.

The seal detecting means according to the present invention, wherein the inner side of the outer case of the electronic device is gas supply side, and the outer side is detecting side.

The seal detecting means according to the present invention, wherein the outer side of the outer case of the electronic device is gas supply side, and the inner side is detecting side.

The seal detecting means according to the present invention further comprising adjusting the compressed gas to a fixed value and then supplying the compressed gas to the gas supply side.

The preferred embodiment of the present invention supplies high pressure compressed gas to the gas supply side of the outer case of the electronic device, and detects the output gas to calculate the flow. Since the detecting side normally is under the atmosphere pressure, if the outer case of the electronic device has a leakage, the high pressure gas will immediately flow from the gas supply side to the detecting side, and then the detecting side will further output large amount of gas to the flowmeter to show the leaking amount. The sensitivity of the flowmeter is high and can show the results quickly. Therefore, even a very little leakage can also be detected, which can resolve all the problems caused by the conventional technique. Moreover, by detecting the gas flow, the leaking amount of the gas can be known, which can also be provided as the reference to improve the product.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
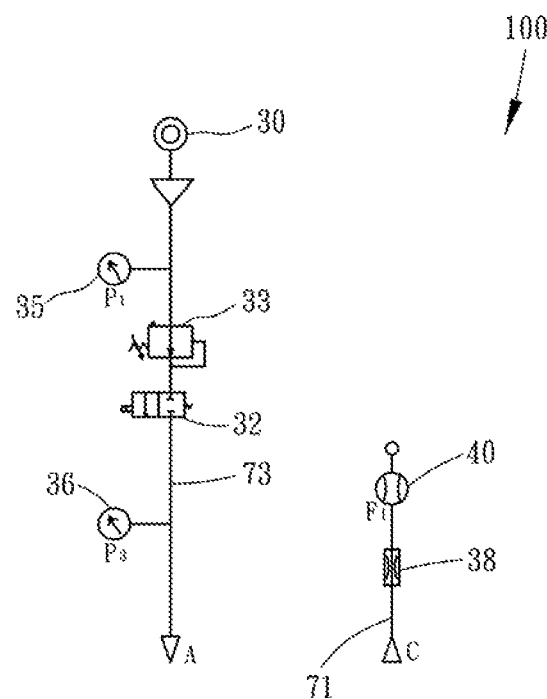
FIG. 1 is a schematic diagram of the seal detecting device of a preferred embodiment of the present invention.
Figure 1:
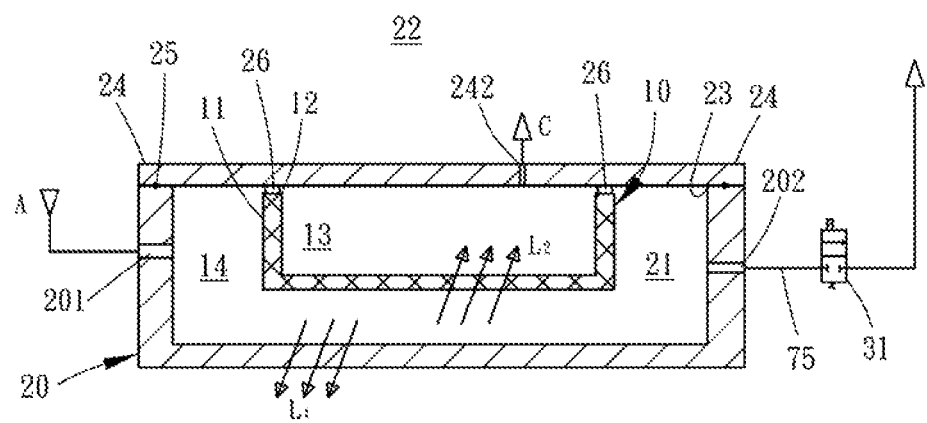

Please refer to FIG. 1, which shows a schematic diagram of a preferred embodiment of the seal detecting device 100 according to the present invention. In order to show the features of the present embodiment, the surface of the outer case, the interior elements and devices of the electronic device are all omitted. Only the structures related to the claimed feature of the present invention are shown. In the present embodiment, the electronic device can be a smartphone, a personal digital assistant (PDA), tablet, smart watch, camera, cam recorder, etc.

In the present embodiment, the seal detecting device 100 is mainly used to test the sealing condition of the electronic device. The Outer case 11 of the electronic device 10 is provided with a through hole 12. The inner side 13 of the outer case 11 communicates with the outer side 14 of the outer case 11 of the electronic device 10 via the through hole 12.

The seal detecting device 100 includes a container 20, a compressed gas supplying device 30, and a flowmeter 40.

In the present embodiment, the container 20 has an accommodating space 21. The accommodating space 21 has an opening 23. The accommodating space 21 communicates outside 22 through the opening 23 and has a cover 24. The cover 24 covers the opening 23. When the cover 24 covers the opening 23, an airtight container is formed. The periphery of the airtight container is in sealed condition, and there is a sealing element 25 disposed between the container 20 and the cover 24. When being under testing, the electronic device 10 is placed inside the airtight container, and the cover 24 covers the through hole 12 of the electronic device 10, creating two spaces in the container 20. One of the two spaces is a space inside the inner side 13 of the electronic device 10 (shown in the FIGS., element 13), the other one of the two spaces is another space outside the outer side 14 of the electronic device 10 (shown in the FIGS., element 14). Of course, the sealing element 26 between the airtight container 20 and the electronic device 10 is essential. In the airtight container 20, either the inner side 13 or the outer side 14 of the outer case 11 is used as a gas supply side, while the other one of the inner side 13 and the outer side 14 is used as detecting side. Besides, the cover 24 of the container 20 has a gas outlet 242 in the detecting side. The gas outlet 242 corresponds to and is within the range of the through hole 12 of the electronic device 10. The container 20 also has a gas inlet 201 and gas outlet 202 in the gas supply side. The gas inlet 201 and the gas outlet 202 are away from the through hole 12 in the outer case 11 of the electronic device 10. That is to say, the gas inlet 201 and the gas outlet 202 are not situated in the corresponding position of the through hole 12. Besides, the container 20 has a fixture (not shown in the figures) for securing the electronic device 10. The fixture is not the claimed feature of the present invention, thus not being described hereinafter.

In the present embodiment, the compressed gas supplying device 30 is mainly used to provide the compressed gas which is needed by the seal detecting device of the present invention. The compressed gas supplying device 30 is linked to the gas supply side in the outer case 11 of the electronic device 10 inside the airtight container 20. In the present embodiment, the gas supply side is the outer side 14 in the outer case 11, and the inner side 13 of the outer case 11 is the detecting side. Since the gas supply side is full of compressed gas, and the detecting side is under normal atmosphere pressure, the gas pressure in the gas supply side is higher than that of the detecting side. In the present embodiment, a pipeline 73 is further provided to be connected to the compressed gas supplying device 30 and the gas supply side of the outer case 11 in the airtight container 20, which is also known as the outer side 14 of the outer case 11.

The compressed gas supplying device 30 in the present embodiment is a gas compressor or a container storing compressed gas. The gas pressure applied in the present embodiment is 5 kg/cm$^2$-10 kg/cm$^2$.

The flowmeter 40 in the present embodiment is connected to the detecting side of the outer case 11 in the airtight container 20, which is also known as the inner side 13 of the outer case 11, and thus the gas flow can be detected to evaluate if the sealing of the outer case 11 has a leakage. The pipeline 71 interconnects the flowmeter 40 and the detecting side of the outer case 11. Besides, the flowmeter 40 can be a digital display flowmeter. The present embodiment further includes a shutoff valve 38. When the gas flow is over a threshold, the shutoff valve 38 can prevent the flowmeter 40 from being damaged. In the present embodiment, the shutoff valve 38 is disposed on the gas supply side of the outer case 11. That is to say, a control valve 31 for controlling the gas exhausting is disposed on the outer side 14 of the case 11 in the airtight container 20. After the detecting process, the control valve 31 will be driven to discharge the gas on the gas supply side. Since the gas used in the present seal detecting device is air, the gas can be directly discharged to the outside and thus not harm the environment. In the present embodiment, a pipeline 75 interconnects the control valve 31 and the air supply side.

In one of the preferred embodiment of the present invention, a control valve 32 is disposed at the output end of the compressed gas supplying device 30 to turn on or shutoff the gas output from the compressed gas supplying device 30.

Besides, in one preferred embodiment of the present invention, a pressure control valve 33 is also disposed at the output end of the compressed gas supplying device 30. The pressure control valve 33, functioning as a pressure regulator limits the outputted gas pressure of the compressed gas supplying device 30 within a fixed value, so that the detecting process can be standardized. Of course, a first pressure meter 35 is disposed at the output end of the compressed gas supplying device 30, and a second pressure meter 36 is also connected to the gas supply side, as known as the outer side 14, of the outer case 11 in the airtight container 20. The second pressure meter 36 is able to display and monitor the outputted gas pressure of the compressed gas supplying device 30, and the gas pressure on the gas supply side of the outer case 11.

When the electronic device 10 is under sealing detection process, the gas of the compressed gas supplying device 30 is supplied to the gas supply side, as known as the outer side 14 of the outer case 11, of the airtight container 20 via the pipeline 73. If there is a leakage on the outer case 11 (as shown in FIG. 1, arrow L2), the high pressure gas will pass through the leakage on the outer case 11 and enter into the detecting side, which is known as the inner side 13 of the outer case. After the high pressure gas expands, the expanded gas will flow through the flowmeter 40 via the pipeline 71 to drive the flowmeter 40, so that the leakage of the outer case 11 can be detected. If there is no leakage on the outer case 11, the high pressure gas will not enter into the detecting side, so that there will be no gas outputted to the flowmeter 40 from the detecting side. As such, the flowmeter 40 will not be activated. The advantage of the present embodiment lies in that, even the airtight container 20 has a leakage (shown in FIG. 1, arrow L1), the flowmeter 40 will still work if the outer case 11 has a leakage (L2); if the outer case 11 has no leakage, the flowmeter 40 will not be activated. Therefore, the leakage of the airtight container 20 will not influence the detecting results of the flowmeter 40, which can thus solve the problem caused by the conventional technique that when the airtight container 20 has a leakage, the detecting results can be interfered. Besides, the flowmeter is very sensitive, a detecting process can be done in about 2-5 seconds, which is convenient and fast compared to the 30 seconds detection time of the traditional detecting device.

Figure 2:
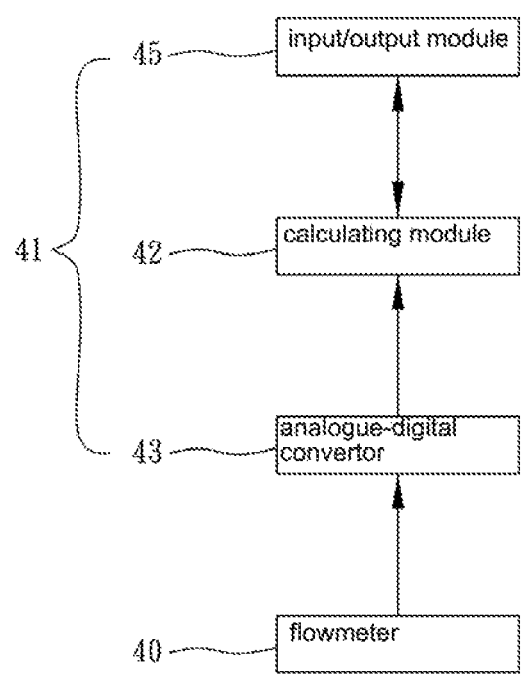
FIG. 2 is a signal processing flowchart of the seal detecting device of a preferred embodiment of the present invention.

Besides, please refer to FIG. 2, the seal detecting device 100 according to the present invention further includes a signal processor 41. The signal processor 41 includes a calculating module 42, an analogue-digital convertor 43, and an input/output module 45; the flowmeter 40 is an electronics gas flowmeter.

In the present embodiment, the calculating module 42 is used to calculate the input/output and all kinds of information. The analogue-digital convertor 43 can convert the analogue signal of the flowmeter 40 into a digital signal. The input/output module 45 can use touch screen as an operating panel to input command and output graph/text message. The analogue gas flow signal obtained by the flowmeter 40 is converted to digital signal and processed by the calculating module 42, and then the result is shown by the input/output module 45. The seal detecting device according to the present invention has high sensitivity and can detect the very small leakage. The detecting result can be shown in numerical format or graphical format, which can show the amount of the leakage for the further improvement of the detecting device.

Figure 3:
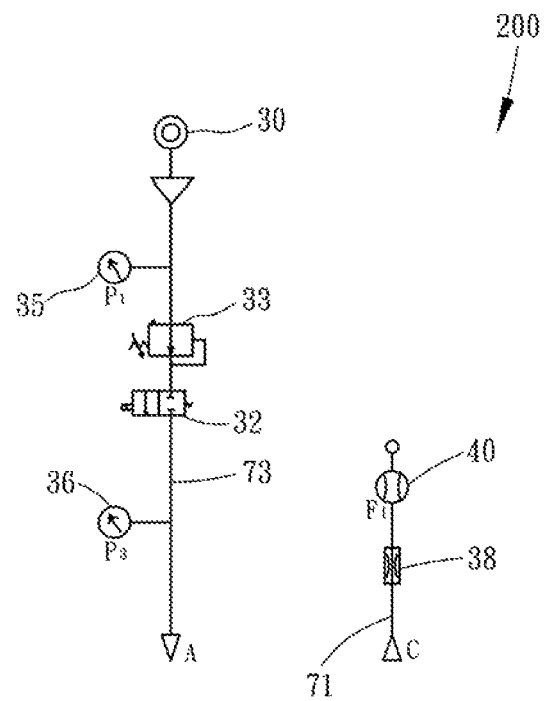
FIG. 3 is another schematic diagram of the seal detecting device of a preferred embodiment of the present invention.
Figure 3:
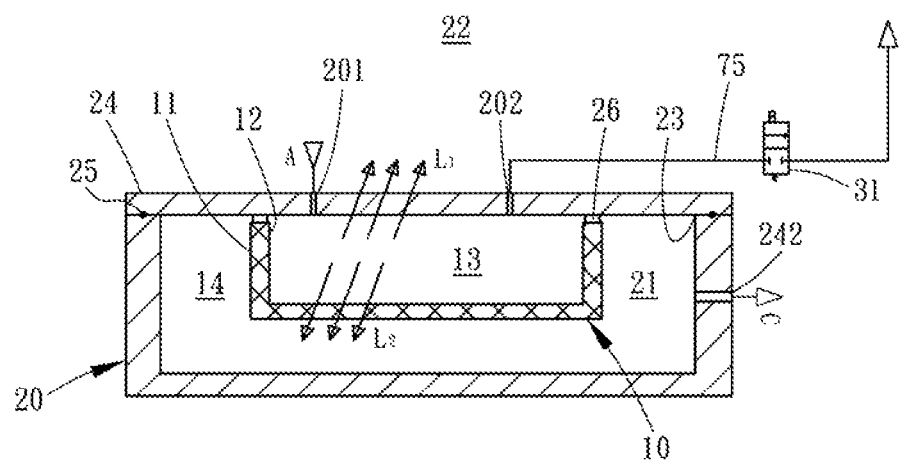

FIG. 3 shows another preferred embodiment of the seal detecting device 200. FIG. 2 is also included in the present embodiment. In the present embodiment, all the similar elements as the previous embodiment are shown with the same labeling number. The present embodiment also includes an electronic device 10, a container 20, a compressed gas supplying device 30, and a flowmeter 40. The present embodiment also includes a first pressure meter 35, a second pressure meter 36, a pressure control valve 33, a shutoff valve 38, control valves 31/32, signal processor 41, and all kinds of pipeline 71/73/75. The structure and function of all these elements are the same as the previous embodiment. The differences of the present embodiment and the previous embodiment lie in that:

In the previous embodiment, the gas supply side is the outer side 14 of the outer case 11, and the detecting side is the inner side 13 of the outer case 11. In the present embodiment, the gas supply side is the inner side 13 of the outer case 11, and the detecting side is the outer side 14 of the outer case 11. Therefore, the gas inlet 201 and the gas outlet 202 are disposed at the position of the cover 24 and correspond to the through hole 12 on the outer case 11; the gas outlet 242 on the detecting side is disposed on the airtight container 20. The gas leakage direction L2 on the outer case 11 and the gas leakage direction L2 on the airtight container 20 are opposite to the previous embodiment (as shown in FIG. 2, the arrow direction). The structure, operation, and the effect of the present embodiment are the same as the previous embodiment, and thus not described hereinafter.

Figure 4:
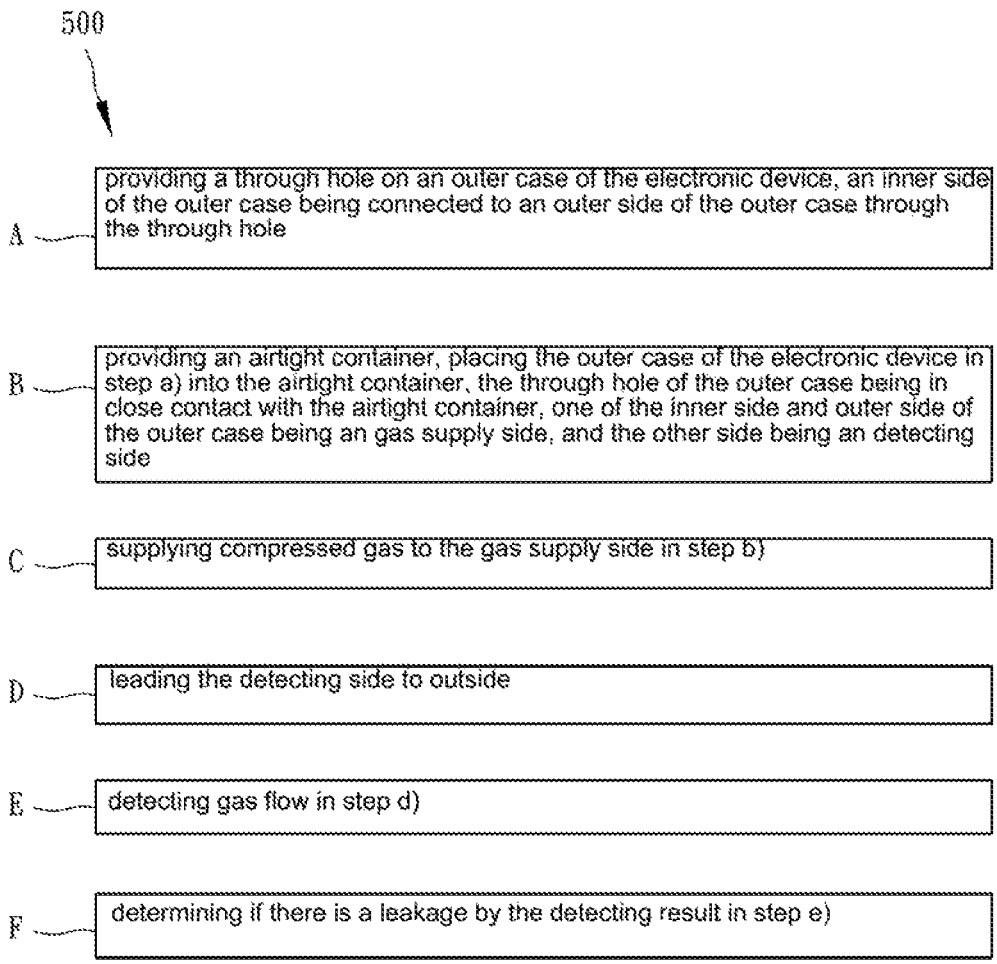
FIG. 4 is a flowchart of the seal detecting means of a preferred embodiment of the present invention.

FIG. 4 shows the seal detecting means 500 according to the present embodiment. Even though the seal detecting means 500 is described as a series of actions, the sequence of these actions is not limited as the following description. For example, some of the actions can deviate from the mentioned illustration and the executing sequence. These actions can be co-executed with other actions or executed in different sequence. Besides, not all of the actions described in the present invention are executed in a same embodiment or multiple embodiments. Moreover, one or more actions described herein may be accomplished by employing one or more separate actions and/or stages.

In step a, open a through hole on the outer case of the electronic device. The inner side of the electronic device communicates with the outer side of the electronic device via the through hole.

In step b, provide an airtight container, place the electronic device in step a into the airtight container, and the through hole on the outer case is in close contact to the airtight container; define that one of the inner side and outer side of the electronic device is gas supply side, and the other side is the detecting side. The airtight container is under normal atmosphere; the gas pressures on the inner side and the outer side of the electronic device are the same.

In step c, supply compressed gas to the gas supply side in step b; supply compressed gas to the gas supply side of the electronic device from the outer side of the airtight container to the inner side of the airtight container. In the present embodiment, the compressed gas can be air or other gases. A high safety, non-polluted, and easy-discharged gas is a better choice, such as nitrogen, hydrogen, or inert gas. Wherein, the gas pressure on the gas supply side filled with compressed gas is larger than that of the detecting side.

In step d, lead the detecting side in step b to outside.

In step e, detect gas flow in step d. The present embodiment use flowmeter to detect the gas flow.

In step f, determine if there is a leakage by detecting result of the step e; the leakage existing if the gas flow is detected, otherwise no leakage exists. In this seal detecting means, the leaking amount can be known by monitoring the gas flow, which can be used as the reference to improve the seal detecting device.

In step b, the inner side of the outer case of the electronic device is gas supply side, and the outer side is detecting side; however, the outer side of the outer case of the electronic device can also be the gas supply side, and the inner side is the detecting side.

In the present embodiment, this seal detecting means comprising adjusting the compressed gas to a fixed value and then supplying the compressed gas to the gas supply side. By the standardized detecting procedure, the monitoring, analyzing, and judging of the leaking is more convenient. Of course, this seal detecting means further including discharging the gas after the detecting procedure is completed.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A seal detecting device for detecting a leakage on an outer case of an electronic device, wherein an outer case of the electronic device is provided with a through hole, an inner side of the outer case is connected to an outer side of the outer case through the through hole, the seal detecting device comprising:
   a container including an accommodating space, the accommodating space having an opening, the accommodating space communicating with outer space and having a cover disposed thereon to cover the opening so as to form an airtight container; when being under detection, the outer case is placed inside the airtight container, the cover covers and seals the through hole of the outer case, one of the inner side and outer side of the outer case being a gas supply side, and the other side being a detecting side;
   a compressed gas supplying device connected to the gas supply side of the outer case inside the airtight container to provide compressed gas; and
   a flowmeter connected to the detecting side of the outer case to detect a flow so as to detect if there is a leakage on the outer case of the electronic device.

2. The seal detecting device according to claim 1, wherein the inner side of the outer case is gas supply side, and the outer side is detecting side.

3. The seal detecting device according to claim 1, wherein the outer side of the outer case is gas supply side, and the inner side is detecting side.

4. The seal detecting device according to claim 1, wherein the compressed gas supplying device is a gas compressor or a container storing compressed gas.

5. The seal detecting device according to claim 1, wherein the compressed gas supplying device has a control valve at an outputting end for turning on or shutting off an outputting of compressed gas.

6. The seal detecting device according to claim 1, wherein the compressed gas supplying device has a pressure regulator at an outputting end for limiting an outputted gas pressure of the compressed gas supplying device within a fixed value.

7. The seal detecting device according to claim 1, wherein the gas supply side of the outer case of the electronic device has a control valve for exhausting gas.

8. The seal detecting device according to claim 1, further comprising a signal processor, the signal processor including a calculating module, an analogue-digital convertor, and an input/output module; the flowmeter being an electronical gas flowmeter, wherein an analogue signal of the flowmeter is converted to a digital signal by the analogue-digital convertor, and the digital signal is processed by the calculating module; the input/output module inputs a command to the calculating module to output figure and text messages.

9. The seal detecting device according to claim 1, wherein the flowmeter is a digital display flowmeter.

10. Seal detecting means for detecting a leakage on an outer case of an electronic device, comprising:
   a) providing a through hole on the outer case of the electronic device, an inner side of the outer case being connected to an outer side of the outer case through the through hole;
   b) providing an airtight container, placing the outer case of the electronic device in step a) into the airtight container, the through hole of the outer case being in closed and sealed contact with the airtight container, one of the inner side and outer side of the outer case being a gas supply side, and the other side being a detecting side;
   c) supplying compressed gas to the gas supply side in step b);
   d) leading the detecting side to outside;
   e) detecting gas flow in step d);
   f) determining if there is a leakage; the leakage existing if the gas flow is detected, otherwise no leakage exists.

11. The seal detecting means according to claim 10, wherein the inner side of the outer case of the electronic device is gas supply side, and the outer side is detecting side.

12. The seal detecting means according to claim 10, wherein the outer side of the outer case of the electronic device is gas supply side, and the inner side is detecting side.

13. The seal detecting means according to claim 10 further comprising adjusting the compressed gas to a fixed value and then supplying the compressed gas to the gas supply side.

* * * * *